(12) United States Patent
Malczyk et al.

(10) Patent No.: US 11,022,460 B2
(45) Date of Patent: Jun. 1, 2021

(54) PARKING DISPLAY FOR A VEHICLE

(71) Applicant: Ford Global Technologies, LLC, Dearborn, MI (US)

(72) Inventors: Andrew Malczyk, London (GB); Matthew Shine, Ilford (GB); Isabella Williamson, Dearborn, MI (US); Tom Drake, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/805,248

(22) Filed: Feb. 28, 2020

(65) Prior Publication Data

US 2020/0278218 A1    Sep. 3, 2020

(30) Foreign Application Priority Data

Mar. 1, 2019 (GB) ...................... 1902785

(51) Int. Cl.
*G01C 21/36* (2006.01)
*G08G 1/14* (2006.01)

(52) U.S. Cl.
CPC ....... *G01C 21/3685* (2013.01); *G01C 21/362* (2013.01); *G01C 21/3682* (2013.01); *G08G 1/144* (2013.01); *G08G 1/145* (2013.01)

(58) Field of Classification Search
CPC .............. G01C 21/3685; G01C 21/362; G01C 21/3682; G08G 1/144; G08G 1/145
USPC ...................................................... 340/932.2
See application file for complete search history.

(56) References Cited

U.S. PATENT DOCUMENTS

| 2009/0150073 A1* | 6/2009 | Caraballo | G01C 21/3685 |
| | | | 701/414 |
| 2009/0204319 A1* | 8/2009 | Shanbhag | G06Q 10/06 |
| | | | 701/533 |
| 2009/0204325 A1* | 8/2009 | Chowdhary | G06Q 10/087 |
| | | | 701/300 |

(Continued)

FOREIGN PATENT DOCUMENTS

WO    WO-2018156112 A1 *  8/2018 ............. G06Q 10/02

*Primary Examiner* — Kerri L McNally
(74) *Attorney, Agent, or Firm* — Brandon Hicks; Eversheds Sutherland (US) LLP

(57) ABSTRACT

A method comprises determining a first location of a vehicle being driven by a road user and retrieving, from a first database, a first set of parking information. Each entry in the first set of parking information is associated with a physical location that is within a first distance of the first location. For each entry in the first set of parking information, the method comprises displaying, on a graphical user interface, a symbol at a virtual location corresponding to the physical location associated with the entry. The method comprises determining a second location of the vehicle and, if the second location is above a first threshold distance away from the first location and retrieving, from the first database, a second set of parking information. Each entry in the second set of parking information being associated with a physical location that is within a second distance of the second location. For each entry in the second set of parking information, the method comprises displaying, on a graphical user interface, a symbol at a virtual location corresponding to the physical location associated with the entry.

17 Claims, 5 Drawing Sheets

(56) References Cited

U.S. PATENT DOCUMENTS

| | | | | |
|---|---|---|---|---|
| 2012/0200430 A1* | 8/2012 | Spahl | ................ | G01C 21/3685 |
| | | | | 340/932.2 |
| 2012/0265434 A1* | 10/2012 | Woodard | ............... | G08G 1/147 |
| | | | | 701/423 |
| 2013/0257632 A1* | 10/2013 | Harber | ................ | G08G 1/0112 |
| | | | | 340/932.2 |
| 2016/0047672 A1* | 2/2016 | Sachdev | ............ | G01C 21/3423 |
| | | | | 701/438 |
| 2016/0061618 A1* | 3/2016 | Benenson | .......... | G01C 21/3453 |
| | | | | 701/428 |
| 2018/0268322 A1* | 9/2018 | Liu | ...................... | G06Q 20/145 |
| 2018/0313661 A1* | 11/2018 | Eyster | ............... | G01C 21/3617 |

* cited by examiner

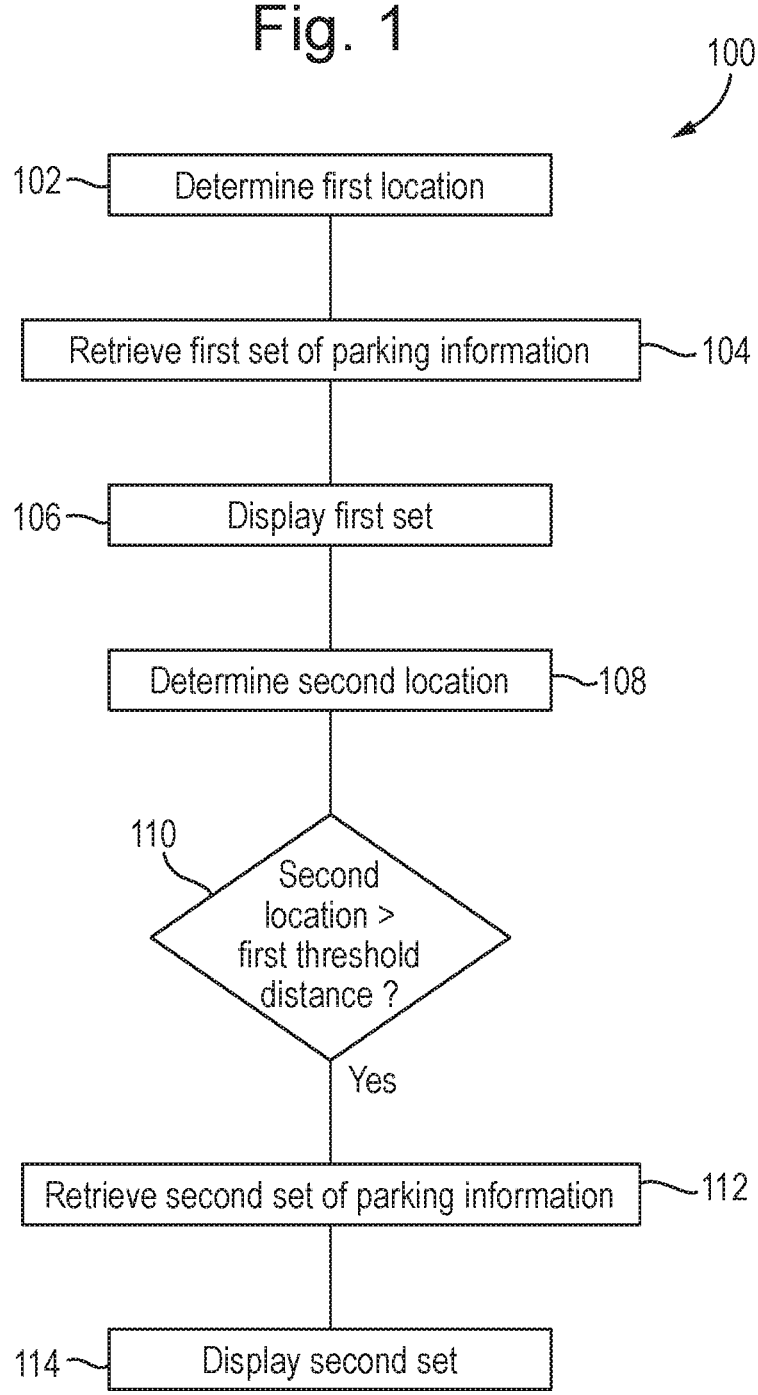

PARKING DISPLAY FOR A VEHICLE

CROSS-REFERENCE TO RELATED APPLICATIONS

The present disclosure claims priority to and the benefit of GB application No. 1902785.3, filed Mar. 1, 2019, which is hereby incorporated by reference herein in its entirety.

FIELD

The present disclosure relates to a method for displaying parking information to a user of a vehicle.

BACKGROUND

There can be limited visibility for some drivers as to where they can park on the street in towns or cities. This can be particularly true for city centres where congestion is often high relative to the surrounding areas. Currently, drivers can have difficulty knowing where they are able to park when driving around an area, particularly as there may be parking bays out of their direct line of sight.

SUMMARY

According to some examples presented herein, there is provided a method comprising determining a first location of a vehicle being driven by a road user; retrieving, from a first database, a first set of parking information, each entry in the first set of parking information being associated with a physical location that is within a first distance of the first location; displaying, for each entry in the first set, on a graphical user interface, a symbol at a virtual location corresponding to the physical location associated with the entry; determining a second location of the vehicle and, if the second location is above a first threshold distance away from the first location; retrieving, from the first database, a second set of parking information, each entry in the second set of parking information being associated with a physical location that is within a second distance of the second location; and displaying, for each entry in the second set, on a graphical user interface, a symbol at a virtual location corresponding to the physical locations associated with the entry.

The GUI may present to a user of the vehicle (e.g. a driver) a virtual image that is a virtual road map (corresponding to the real-world streets on which the user is travelling). A marker may indicate the virtual position and orientation of the vehicle which corresponds to the current position and orientation of the vehicle in the real world. The GUI may be presented in a display screen such as a heads-up display (e.g. in a dash panel of the vehicle) or otherwise on another screen (e.g. a smart device). The GUI is therefore a virtual world with virtual locations, each representing real-world locations near the location of the vehicle. According to aspects of this disclosure symbols are displayed on the GUI at virtual locations corresponding to physical locations. For example a virtual road may represent a read road in the vicinity of the vehicle etc.

When the vehicle is at a first, or second, location, symbols are displayed on the GUI at virtual locations corresponding to real locations, for each entry in the first, or second, set (e.g. for each entry that has an associated physical location that is the first, or second, distance of the first, or second, location).

The first and/or second distances may be related to a virtual dimension of the virtual road map on the GUI. For example, the user may be looking at a road map having a virtual area (the road area displayed to the user and visible on the display). The first and/or second distances may correspond to a multiple of the displayed area (e.g. twice a radius etc.). This may mean that as the vehicle advances and the virtual road map advances accordingly, symbols corresponding to events (already retrieved and possibly cached) may be displayed on new virtual locations previously unshown. In one example, the location of the vehicle is determined periodically so that the GUI may be "refreshed", taking into account a new location of the vehicle. The location may be determined at periodic time intervals (e.g. every 10 seconds) or may be determined when the vehicle's current distance is a predetermined distance away from the previously determined distance (e.g. determined every 1 km).

Each entry comprises parking information associated with a physical location. For example an entry is associated with a physical location and contains information as to whether there are any parking bay(s) at that location. The information can be any of: parking times for those bays, price per hour, restrictions such as permits or disability stickers etc. Retrieving, from the first database, may comprise comparing, for each entry, the physical location associated with that entry to the first and/or second location of the vehicle to determine if the entry is within the first and/or second distance, respectively. Therefore, in determining which database entries are to be part of the first set, and therefore which physical locations are to be displayed on the GUI, the method may compare the physical locations of each entry to the first location of the vehicle (e.g. the current location) so that those locations within the first distance can be displayed.

The displayed symbol may comprise a logo and/or a picture and/or text. For example, a symbol for an entry corresponding to a physical location at which there is a parking bay may be the symbol of a parking bay with associated text displaying the price per hour. The symbol may therefore comprise a speech bubble or text box etc. The symbol may be a symbol of a parking bay and therefore the method may comprise displaying a virtual parking bay at a virtual location corresponding to the physical location of that parking bay.

The method may further comprise analysing an entry in the first set of parking information to determine whether the entry represents a parking bay in which parking is not permitted or a parking bay in which parking is permitted; and, if the entry represents a parking bay in which parking is not permitted then the method comprises displaying the symbol associated with the entry in a first colour; and, if the entry represents a parking bay in which parking is permitted then the method comprises displaying the symbol associated with that entry in a second colour.

This may be performed for each entry in the first set of parking information. The method may further comprise analysing an entry in the second set of parking information to determine whether the entry represents a parking bay in which parking is not permitted or a parking bay in which parking is permitted; and, if the entry represents a parking bay in which parking is not permitted then the method comprises displaying the symbol associated with that entry in the first colour; and, if the entry represents a parking bay in which parking is permitted then the method comprises displaying the symbol associated with that entry in the second colour. This may be performed for each entry in the second set of parking information.

Therefore, each entry may comprise data that represents a real-world parking bay at a real-world location, and in particular whether parking is permissible in that bay (e.g. at the current day and/or time). For example the parking bay may be a restricted bay in which case its location would be displayed on the GUI in the first colour. As will be described below this colour may be grey and therefore this location may be displayed as a "greyed-out" parking bay, the colour in this example being indicative of the restrictive nature of the parking bay. On the other hand, the second colour may be green and therefore in this example parking bays in which it is possible to park (e.g. at the current day and/or time) would be displayed in the form of their physical locations highlighted in green, indicating that it is possible for the user to park in these locations. Herein by "restricted bay" it is means a parking bay in which parking is not (legally) allowed/permissibly at the time the entry representing the parking bay is retrieved from the database. For example, a parking bay in which parking is possible during Monday-Friday between 9 and 5 may be considered as a restricted bay outside of these hours or on the weekend etc.

The method may further comprise determining, e.g. via a GPS, a location of the vehicle and comparing a physical location corresponding to a first entry of at least one of the first and second sets of parking information to the determined location of the vehicle and, if the physical location corresponding to the first entry corresponds to the immediate left or immediate right of the determined location of the vehicle then the method comprises displaying the symbol associated with the first entry in a colour on the graphical user interface. If the first entry represents a parking bay in which parking is not permitted then the highlighted colour is a third colour, and/or if the first entry comprises a parking bay in which parking is permitted then the highlighted colour is a fourth colour.

The third and fourth colours may each comprise a border, and displaying the symbol in the third and/or fourth colour may comprise surrounding the symbol with a border of that colour. For example, a symbol associated with a parking bay in which it is not allowed to park may be highlighted in grey with a red border (optionally in addition to a "no parking" symbol) and/or a symbol associated with a parking bay in which it is allowed to park may be highlighted in green with a blue border. In this way the GUI may display the parking bays that are to the immediate left or right of the vehicle's position in a virtual position that is to the immediate left or right of a marker resenting the current location of the vehicle. These bays may be of the first or second colour and may have a coloured border (whose colour is the third or fourth colour), which may readily inform the user whether parking is possible. In this way the user, looking at the display, may readily be informed if parking is possible in the bays in the immediate vicinity of the vehicle.

If the physical location associated to the first entry corresponds to the immediate left or the immediate right of the determined location of the vehicle, then the method may comprise highlighting a user-selectable area on the graphical user interface. Therefore, if there are parking bays whose physical locations correspond to the immediate-left of the vehicle and another parking bay whose physical location corresponds to the immediate-right of the vehicle then two user-selectable buttons may be displayed on the GUI, for example at a lower-end of the display and/or below an icon or marker representing the current position of the vehicle. The user-selectable area may represent an area of the display which, if pressed by a user, causes the display to retrieve and display further information, as will be described below. If the first entry represents a parking bay in which parking is not permitted then the method comprises highlighting the user-selectable area in a fifth colour, and/or if the first entry represents a parking bay in which parking is permitted then the method comprises highlighting the user-selectable area in a sixth colour. The fifth colour may be the same as the first and the sixth colour may be the same as the second.

Therefore, in one example, if there is a parking bay to the immediate left of the vehicle in which it is not allowed to park, a corresponding virtual parking bay may be displayed to the immediate left of a marker representing the vehicle's current position on the virtual world and a user-selectable area may be highlighted in grey to the lower-left corner of a square display screen (displaying the GUI). In this way the user has the option of selecting the area (e.g., by pressing the display screen) which may cause further information specific to the represented parking bay to be retrieved (e.g. from the first database) and displayed. For example, in response to a user selecting the user-selectable area associated with a parking bay in which parking is permitted, at least one of: maximum stay of parking, price per hour of parking, permitted and/or prohibited times of parking, parking conditions such as whether only those with a disability badge or a parking permit may park etc. may be displayed.

Therefore, user-selection of the area on the display may cause additional parking information (e.g. other than the location of the bay) to be displayed to better inform the user as to whether they want to park in the displayed bay. The user can therefore easily obtain parking information to those bays that are closest to their location.

In one example the symbols themselves are user-selectable. In this example, in response to a user selecting a particular symbol, the method may comprise displaying parking information specific to the entry associated with the symbol. For example, the symbol may represent a parking bay in which parking is permitted and user-selection of the symbol may prompt at least one of: maximum stay of parking in that bay, price per hour of parking in that bay, permitted and/or prohibited times of parking, parking conditions such as whether only those with a disability badge or a parking permit may park etc. to be displayed.

In response to a user selecting a symbol on the graphical user interface the method may further comprise changing the vehicle's destination in a route guidance system to correspond to the physical location selected by the user. The user can therefore be guided to a parking bay that they have decided upon and selected.

In one example the user-selection of a symbol corresponding to a parking bay in which it is possible to park may cause a hyperlink to a webpage where it is possible to book and/or pay for that parking bay to be displayed.

The method presented herein therefore allows the user to make an informed choice concerning where they should park. As the user is driving a vehicle, updated parking information may be retrieved and displayed on a GUI which can show the locations of parking bays within a certain radius of the vehicle's current location. Those bays in which the user may park may be displayed in a second highlighted colour (e.g. green) and those in which the user cannot park may be displayed in a first highlighted colour (e.g. grey or red). Any bays to the immediate left or right of the vehicle's location may be displayed at a location to the left or right of an icon represent the vehicle's current position, and an area for each may be indicated on the display and a user-selectable button may offer the option to view more information on those bays. The selection of a physical location corresponding to a park in which it is possible to park may cause further information about that bay to be revealed and/or may contain a hyperlink to a webpage where the user can book and/or pay for the parking space or may itself be the link to the webpage. Following this the user may select a location so that a route guidance system will change the destination of the vehicle to this selected location.

According to another example of the disclosure there is provided a processing apparatus comprising: a first database configured to store a set of entries, each entry comprising data representing parking information at a physical location; a sensor configured to determine a location of a vehicle; a processor may be configured to perform the method as described above.

According to another example of the disclosure there is provided a non-transitory machine-readable storage medium, encoded with instructions executable by a processor, the machine-readable storage medium comprising instructions to cause the processor to perform the method as described above.

DESCRIPTION OF THE DRAWINGS

For a better understanding of the present disclosure, and to illustrate how certain examples may be put into effect, examples will now be described with reference to the accompanying drawings in which:

FIG. 1 is a flowchart of an example method;

DETAILED DESCRIPTION

FIG. 1 shows an example method 100 (which may be a computer-implemented method) and which may be a method of updating parking information displayed to a road user and/or a method of parking information retrieval.

The method comprises, at step 102, determining (e.g. by at least one processor for example a processor contained in a satellite-navigation system such as a GPS), a first location of a vehicle being driven by a road user. At step 104 the method comprises retrieving, from a first database, a first set of parking information. Each entry in the first set of parking of parking information is associated with a physical location that is within a first distance from the first location of the vehicle. At step 106 the method comprises displaying, for each entry in the first set of parking information, on a GUI, a symbol at a virtual location corresponding to the physical location associated with the entry. At step 108 the method comprises determining a second location of the vehicle. At step 110 the method comprises determining whether the second location is above a first threshold distance away from the first location. If, at step 110, it is determined that the second location is above the first threshold distance away from the first location then the method proceeds to step 112 at which a second set of parking information is retrieved from the first database. Each entry in the second set of parking information is associated with a physical location that is within a second distance of the second location. At step 114 the method comprises, for each entry in the second set, displaying, on a GUI (e.g. the same GUI), a symbol at a virtual location corresponding to the physical location associated the entry.

Figure 2A:
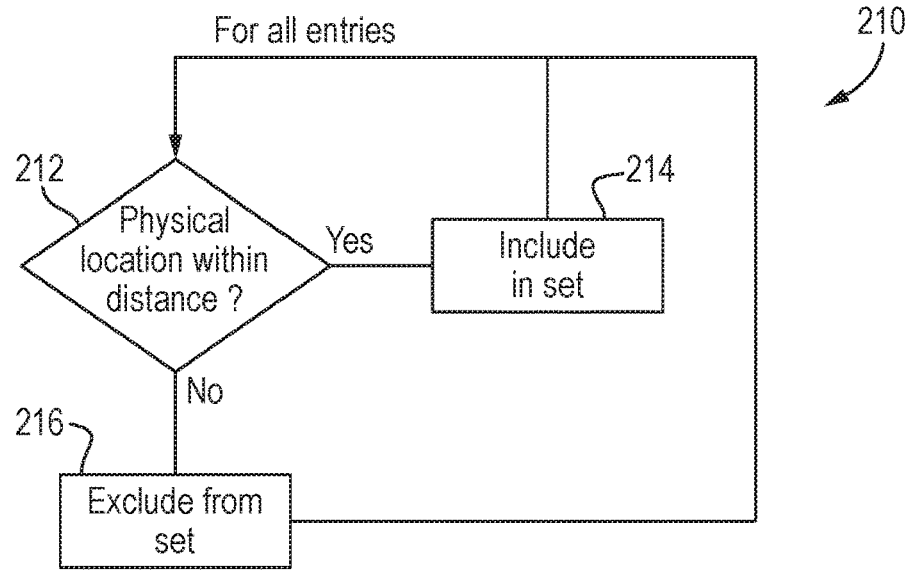
FIGS. 2A-2C are flowchart of example methods that may be performed in conjunction with the method of FIG. 1.
Figure 2B:
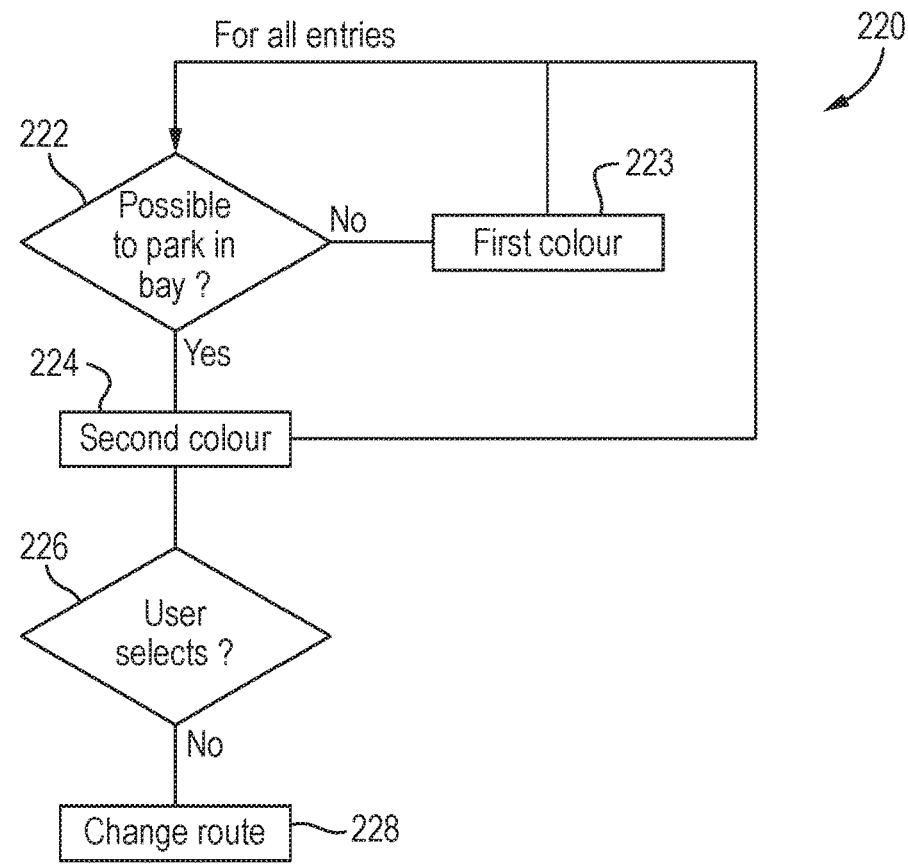
Figure 2C:
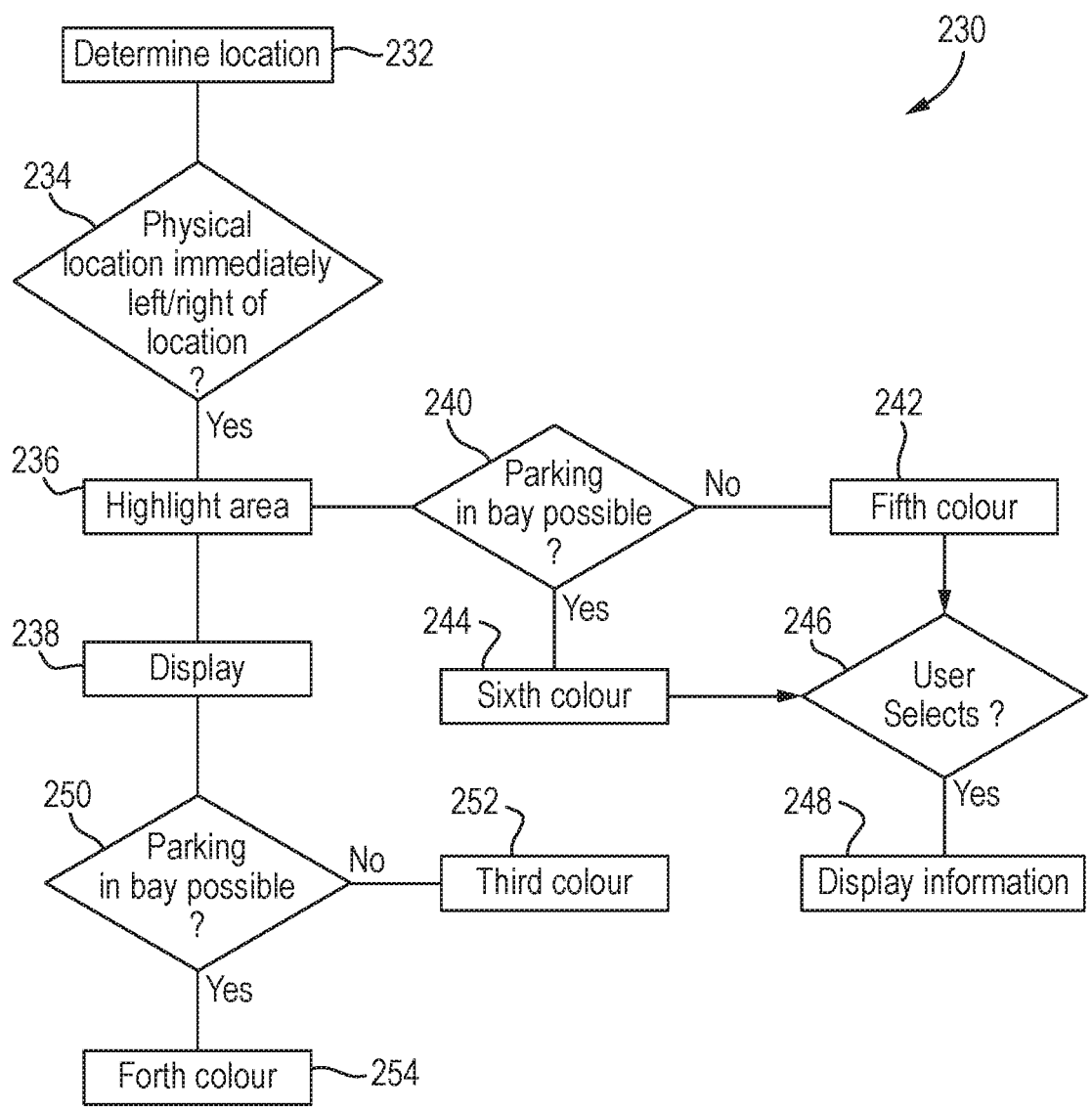

FIGS. 2A-2C each show an example method (which may be computer-implemented method) and which may be a method of updating parking information displayed to a road user and/or a method of parking information retrieval.

The method 210 of FIG. 2A comprises step 212 at which any entry in the first database is analysed and it is determined whether the physical location associated with that entry is within a location of the vehicle to determine if the entry is within a distance of the location. If it is determined, at step 212, that the physical location of the entry is within the distance then that entry is included in the set (step 214). If not, then the entry is not included in the set (step 216). The method 210 of FIG. 2A may be performed as part of step 102 and/or 108 of the method 100. Accordingly, the method 210 may be a method of selecting the first and/or the second set of parking information. For example, when performed as part of step 102 the distance at step 212 is the first distance (and the physical locations are compared to the first location), and the set in which the entry is included/excluded in steps 214 and 216 is the first set. When performed as part of step 108 the distance at step 212 is the second distance (and the physical locations are compared to the second location), and the set in which the entry is included/excluded in steps 214 and 216 is the second set. As indicated by the looping arrow the steps 212-216 are performed for each entry in the first database to determine the first and/or second sets.

The method 220 of FIG. 2b comprises step 222 at which an entry in a set of parking information is analysed to determine whether the entry represents a parking bay in which parking is not permitted or is permitted. If the entry represents a parking bay in which parking is not permitted then at step 223 the method 220 comprises displaying on the GUI the symbol associated with that entry (at a virtual location corresponding to the physical location) in a first colour. On the other hand, if the entry represents a parking bay in which parking is permitted then at step 224 the method 220 comprises displaying on the GUI the symbol associated with that entry in a second colour. As indicated by the looping arrow steps 222-224 may be performed for each entry in the first set and/or the second set. Accordingly the method 220 may be performed as part of the display step 106 and/or the display step 114 of the method 100. Therefore the method 220 may be a method of displaying the parking bays represented by entries in the first and/or second sets. If (step 226) the user selects the symbol on the GUI then, in step 228, the method comprises changing the destination of the vehicle (e.g. via a route-guidance system such as one on the vehicle's display system or on a user's smart phone) to the physical location associated with that symbol.

The method 230 of FIG. 2C comprises at step 232 determining a location of the vehicle. This may be the current location of the vehicle and may be determined via a sensor, such as a GPS. At step 234 a physical location corresponding to an entry (e.g. in the first and/or second set of parking information) is compared to the location determined at step 232 to determine whether the physical location associated to the entry is to the immediate left or immediate right of the vehicle current location (determined at step 232). If so then at step 236 a user-selectable area on the GUI is highlighted (in a fifth or sixth colour) and at step 238 the symbol on the GUI is displayed (in the third or fourth colour). At step 250 it is determined whether parking is permitted in a bay resentenced by the entry and, if parking is not permitted then at step 252 the associated symbol is highlighted in a third colour. If parking is permitted then at step 254 the associated symbol is highlighted in a fourth colour. At step 240 it is determined whether parking is permitted in a bay represented by the entry (like step 250). If parking is not permitted then at step 242 the user-selectable area is highlighted in a fifth colour. If parking is permitted then at step 242 the user-selectable area is highlighted in a sixth colour. If the user selects the selectable area (step 246) then in step 248 further information is displayed.

Although not indicated in FIG. 2C any or all of the steps may be repeated for each entry (e.g. each entry in a set such as the first or second set). For example steps 232-236 and/or steps 240-248 and/or steps 250-254 may be performed for each entry. Accordingly, each entry in a displayed first and/or second set may be analysed and determined whether parking is possible and the physical location and/or user-selectable area may be highlighted accordingly. The steps 236 and 238 may be performed independently of one another or concurrently etc. and their representation in FIG. 2C of being one after the other is purely schematic.

Figure 3A:
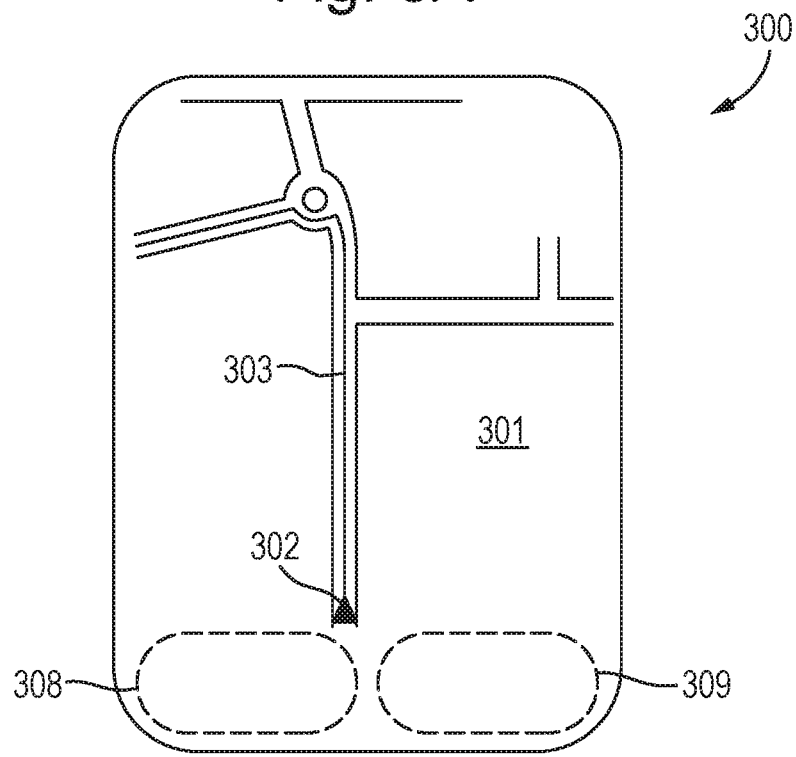
FIGS. 3A and 3B are example displays, e.g. a graphical user interface displaying data according to the method of FIGS. 1 and 2A-2C.
Figure 3B:
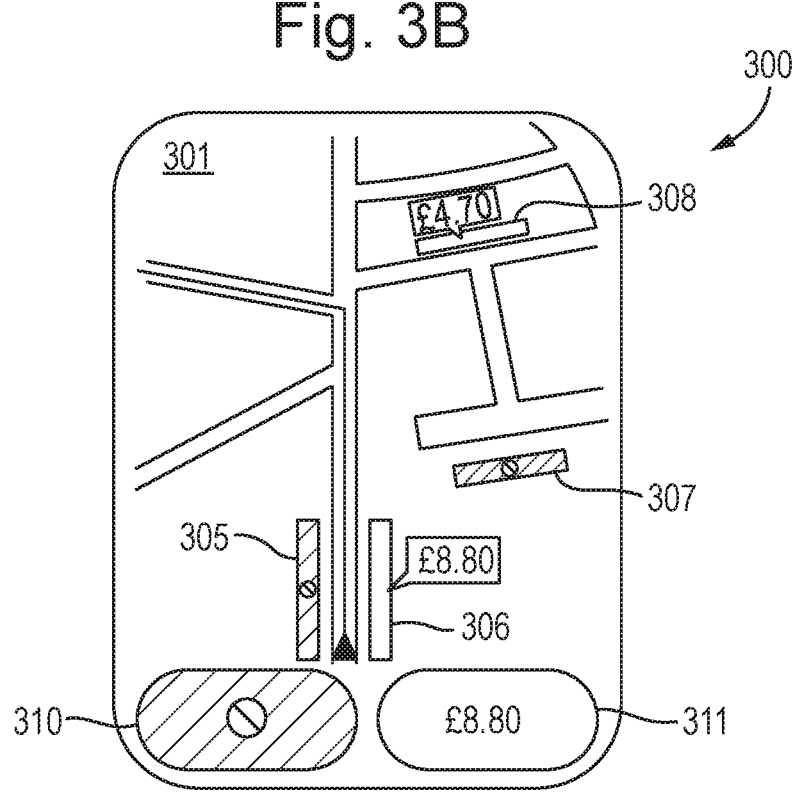

FIGS. 3A and 3B show an example GUI displaying the results of the methods 100, including the methods 210, 220 and 230.

FIG. 3A shows an example GUI 300 displaying a first set of information. The GUI may be displayed on a display screen, for example, of a smart device or in the dash panel of a vehicle. As shown in FIG. 3A the GUI displays a virtual road map 301 representing the immediate environment within a surrounding area of a moving or stationary vehicle. A marker (or locator) 302 shown in the form of an arrowhead depicts the current location and orientation of the vehicle relative to its surroundings. The GUI of this example has a route-guidance functionality and a virtual path 303 shows a calculated route that the user is to take in order for the user to travel to and arrive at their destination. According to the methods described above a first location of the vehicle is determined (for example using a GPS). The first location may be the vehicle's current location (e.g. as represented by the arrowhead 302) at that time. Then, all entries in a first database that are within a (preselected or predetermined) first distance of that location are retrieved and displayed on the GUI. These entries may hold parking information at certain physical locations and the first distance may correspond to a display area, being the area of the GUI that is being displayed to the user. In the example shown in FIG. 3A no entries were determined to be within the first distance of the user's current location and no physical locations are therefore displayed on the GUI 300.

However, at a later time the vehicle is at a new location, a second location. Once this is determined events in the second database that are within a second distance are retrieved. The second distance may be equal to the first or may be different to the first. For example, if the first distance corresponds to a display area at a first time, then at a second time when the vehicles location (a second location) is determined, the user may have (e.g. via pinching or pushing apart the screen) changed (e.g. widened or narrowed) the display area on the GUI. In this example the second distance may be therefore be different to the first and may correspond to the new display area.

FIG. 3B shows the GUI at a later time when a second location of the vehicle has been determined. The first database has been accessed and a second set of parking information has been retrieved, each entry in the set comprising parking-related data corresponding to a physical location. In the FIG. 3B example, the second set comprises four such entries, each entry being associated with a physical location. On the GUI 300, the symbols 305-308 for each entry are displayed on the road map 301. The symbols 305-308 for each entry are displayed at virtual locations of the road map that correspond to their actual locations in the real world. Each symbol takes the form of a virtual parking bay and therefore the GUI 300 presents to the user a virtual map showing the locations of parking bays in their nearby area.

Locations 305 and 307 are each associated with an entry related to a parking bay in which parking is not permitted. Accordingly the locations 305 and 307 are displayed in a first highlighted colour. This may (as is shown in FIG. 3B) comprise displaying a "no parking"-type icon on or in proximity to the physical location associated with the parking bay in which parking is not permitted. The user therefore has a clear visual indication that there is a parking bay close by in which parking is not permitted. The first highlighted colour may, in one example, be grey.

Symbols 306 and 308 are each associated with an entry related to a parking bay in which parking is permitted. Accordingly the symbols 306 and 308 are displayed in a second colour). The second highlighted colour may be green. This may (as is shown in FIG. 3B) comprise displaying a pop-up type icon (such as a speech bubble) that displays the price per hour of parking in that bay. The colour of the pop-up icon may be blue. As is shown the price of parking in the bay corresponding to the locations 306 and 308 are different and the icons, by displaying the price, can better inform the user of which parking bays in the area are possible to park in and how much it will cost per hour to do so.

In one example, a user selecting the symbol 306 or 308 (or the icons displayed therewith) will cause additional parking information may be displayed on the GUI 300. For example, the selection of symbol 308 may cause a pop-up menu to be displayed containing parking information such as: until when it is permitted to park in this bay, if the price per hour of parking drops after a certain time, etc. The pop-up menu may also contain a hyperlink to a website where the user may pay for parking (in this bay) in advance. In another example, a user selecting the symbol 306 (or the icons pointing thereto) will cause a website to open where the user may pay for parking (in this bay) in advance. In another example, a user selecting the symbol 308 may change the destination of the vehicle (e.g. in a route-guidance system) to the selected symbol 308.

Symbols 305 and 306 are, respectively, to the immediate left and immediate right of the vehicle. Accordingly, these symbols are parking bays that are displayed to the immediate left and immediate right of the arrowhead 302 that indicates the vehicle current position and orientation.

Each symbol is highlighted in the form of a bold border. Symbol 305 (representing a bay in which parking is not permitted) is highlighted in a third colour. In one example this may be a red border surrounding the rest of the bay (which may be highlighted or coloured in the first colour, e.g. grey). Symbol 306 (representing a bay in which parking is permitted) is highlighted in a fourth colour. In one example this may be a blue border surrounding the rest of the bay (which may be highlighted or coloured in the second colour, e.g. green). As the symbols 305 and 306 each correspond to parking bays to the immediate left/right of the vehicle's current position a first user selectable area 310 on a lower-left hand side of the display 300 (corresponding to the location 305 to the immediate left of the vehicle) is highlighted in a fifth colour (for example, grey). A second user selectable area 311 on a lower-right hand side of the display 300 (corresponding to the location 306 to the immediate right of the vehicle) is highlighted in a sixth colour (for example, green). Accordingly the fifth and first colours may be the same, and the sixth and second colours may be the same. The dashed areas 308 and 309 respectively of FIG. 3A represent the first and second user selectable areas unhighlighted, e.g. when there are no bays at locations corresponding to the immediate left and/or right of the vehicle.

Figure 4:
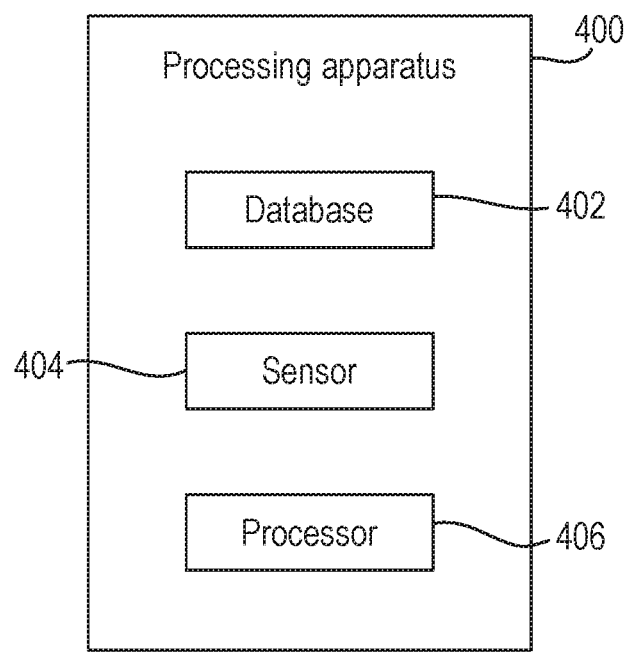
FIG. 4 is an example processing apparatus.

FIG. 4 shows an example processing apparatus 400. The processing apparatus 400 may be to perform any of the methods of the examples of FIGS. 1-2C, respectively, e.g. to produce a display exemplified in FIGS. 3A and 3B. The processing apparatus 400 comprises a database 402, a sensor 404, a processor 406. The database 402 is configured to store a set of entries, each entry comprising data representing parking information at a physical location. The sensor 404 is configured to determine a location of a vehicle. The processor 406 is configured to perform any of the steps of the methods 100-220 as described above with reference to FIGS. 1-2C. Accordingly, the processor 406 is configured to compare the determined location of the vehicle to the physical locations associated with each entries in the database and to, when the location of a vehicle is a first location, retrieve, from the first database, a first set of parking information, each entry in the first set of parking information being associated with a physical location that is within a first distance of the first location and to display, on a graphical user interface, for each entry, a symbol at a virtual location corresponding to the physical location associated with the entry; and, if the location of the vehicle changes to a second location, to retrieving, from the first database, a second set of parking information, each entry in the second set of parking information being associated with a physical location that is within a second distance of the second location and to display, on a graphical user interface, for each entry, a symbol at a virtual location corresponding to the physical locations associated with the entry.

Figure 5:
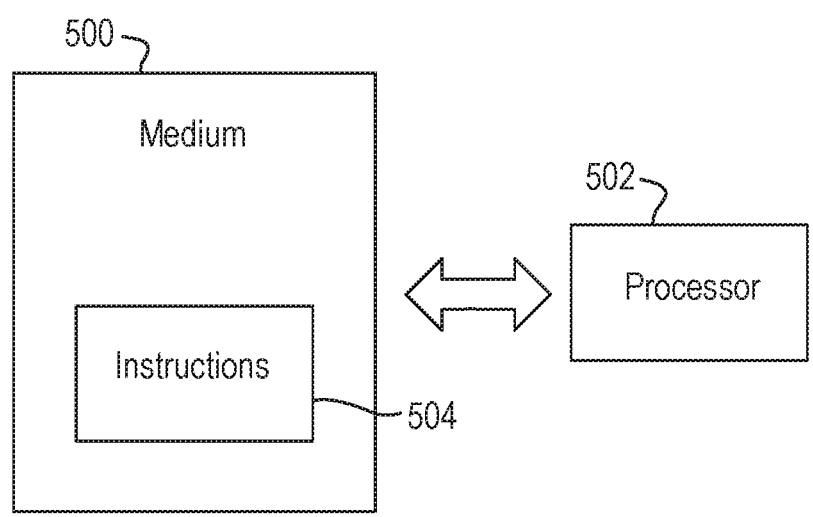
FIG. 5 is an example of a machine readable medium in association with a processor.

FIG. 5 shows an example tangible (and non-transitory) machine readable medium 500 in association with a processor 502. The medium 500 comprises instructions 504 which, when executed by the processor 502, cause the processor 502 to carry out a plurality of tasks. For example the instructions 504, when executed by the processor 502, may cause the processor 502 to carry out any of the steps of the methods 100-220 as described above with reference to FIGS. 1-2C. For example, the instructions 504 comprises instructions to cause the processor 702 to determine a first location of a vehicle being driven by a road user, retrieve, from a first database, a first set of parking information, each entry in the first set of parking information being associated with a physical location that is within a first distance of the first location, display, on a graphical user interface, for each entry, a symbol at a virtual location corresponding to the physical location associated with the entry, determine a second location of the vehicle and, if the second location is above a first threshold distance away from the first location, retrieve, from the first database, a second set of parking information, each entry in the second set of parking information being associated with a physical location that is within a second distance of the second location, and display, on a graphical user interface, for each entry, a symbol at a virtual location corresponding to the physical location associated with the entry.

While the present disclosure has been illustrated and described in detail in the drawings and foregoing description, such illustration and description are to be considered illustrative or exemplary and not restrictive; the disclosure is not limited to the disclosed embodiments. Various alternative examples are discussed through the detailed description. Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

That which is claimed is:

1. A method comprising:
   determining a first location of a vehicle being driven by a user;
   retrieving, from a first database, a first set of parking information, each entry in the first set of parking information being associated with a parking bay at a physical location that is within a first distance of the first location;
   for each entry in the first set of parking information, displaying, on a graphical user interface, a symbol at a virtual location corresponding to the parking bay at the physical location associated with the entry;
   determining a second location of the vehicle and, if the second location is above a first threshold distance away from the first location;
   retrieving, from the first database, a second set of parking information, each entry in the second set of parking information being associated with a parking bay at a physical location that is within a second distance of the second location;
   for each entry in the second set of parking information, displaying, on the graphical user interface, a symbol at a virtual location corresponding to the parking bay at the physical location associated with the entry;
   comparing the physical location corresponding to a first entry of at least one of the first and second sets of parking information to the determined second location of the vehicle; and
   displaying, based on the physical location of the first entry corresponding to an immediate left or an immediate right of the determined second location of the vehicle, the symbol associated with the first entry in a color on the graphical user interface.

2. The method of claim 1, wherein retrieving from the first database comprises comparing, for each entry, the physical location associated with that entry to the first and/or second location of the vehicle to determine if the entry is within the first and/or second distance, respectively.

3. The method of claim 1 further comprising:
   analysing an entry in the first set of parking information to determine whether the entry represents a parking bay in which parking is not permitted or a parking bay in which parking is permitted; and
   if the entry represents a parking bay in which parking is not permitted, then the method comprises displaying the symbol associated with the entry in a first color; or
   if the entry represents a parking bay in which parking is permitted, then the method comprises displaying the symbol in a second color.

4. The method of claim 3, wherein the method is performed for each entry in the first set of parking information.

5. The method of claim 3, further comprising:
   analysing an entry in the second set of parking information to determine whether the entry represents a parking bay in which parking is not permitted or a parking bay in which parking is permitted; and if the entry represents a parking bay in which parking is not permitted, then the method comprises displaying the symbol associated with the entry in the first color; or if the entry represents a parking bay in which parking is permitted, then the method comprises displaying the symbol in the second color.

6. The method of claim 5, wherein the method is performed for each entry in the second set of parking information.

7. The method of claim 1, further comprising: comparing the physical location corresponding to each entry of at least one of the first and second sets of parking information to the determined second location of the vehicle; and if the physical location corresponding to each entry corresponds to the immediate left or immediate right of the determined second location of the vehicle, displaying the symbol associated with the first entry in a color on the graphical user interface.

8. The method of claim 1, wherein if the first entry represents a parking bay in which parking is not permitted, then the color is a third color, and/or if the first entry comprises a parking bay in which parking is permitted, then the color is a fourth color.

9. The method of claim 1, wherein if the physical location of the first entry corresponds to the immediate left or the immediate right of the determined location of the vehicle, then the method comprises highlighting a user-selectable area on the graphical user interface.

10. The method of claim 9, wherein if the first entry represents a parking bay in which parking is not permitted, then the method comprises highlighting the user-selectable area in a fifth color, and/or if the first entry represents a parking bay in which parking is permitted, then the method comprises highlighting the user-selectable area in a sixth color.

11. The method of claim 9, wherein, in response to a user selecting the user-selectable area on the graphical user interface, the method comprises displaying parking information specific to the first entry.

12. The method of claim 11, wherein the parking information specific to the first entry is stored in the first database.

13. The method of claim 1, wherein, in response to the user selecting a displayed virtual location on the graphical user interface, the displayed virtual location corresponding to a physical location, the method comprises displaying parking information specific to the entry corresponding to the physical location on the graphical user interface.

14. The method of claim 1, wherein each entry comprises data representing at least one of: maximum stay of parking, price per hour of parking, permitted, and/or prohibited times of parking.

15. The method of claim 11, wherein the displayed parking information comprises at least one of: maximum stay of parking, price per hour of parking, permitted, and/or prohibited times of parking.

16. The method of claim 3, wherein, if an entry represents a parking bay in which parking is permitted, then the method further comprises displaying a price per hour of parking in that bay on the graphical user interface in a vicinity of the virtual location associated with that entry.

17. The method of claim 1, wherein, in response to the user selecting a displayed virtual location on the graphical user interface, the displayed virtual location corresponding to a physical location, the method comprises changing a destination of the vehicle in a route guidance system to the physical location selected by the user.

* * * * *